W. H. NEBERGALL.
TRACTION WHEEL.
APPLICATION FILED JULY 5, 1912.
1,123,351.
Patented Jan. 5, 1915.
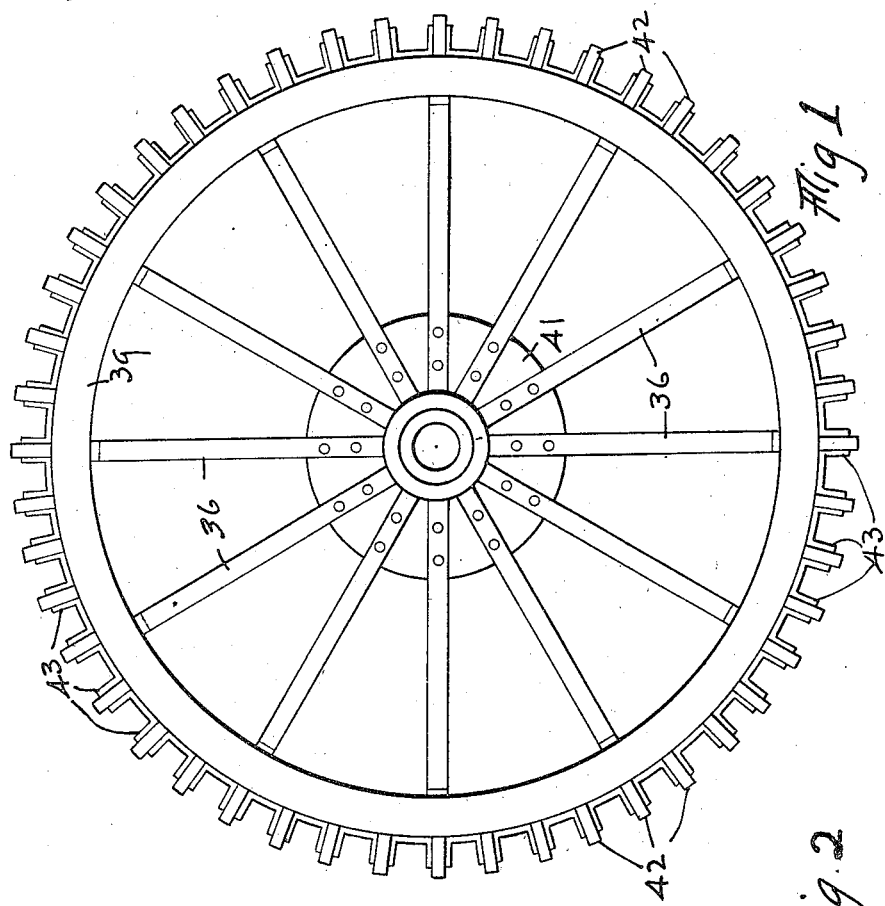
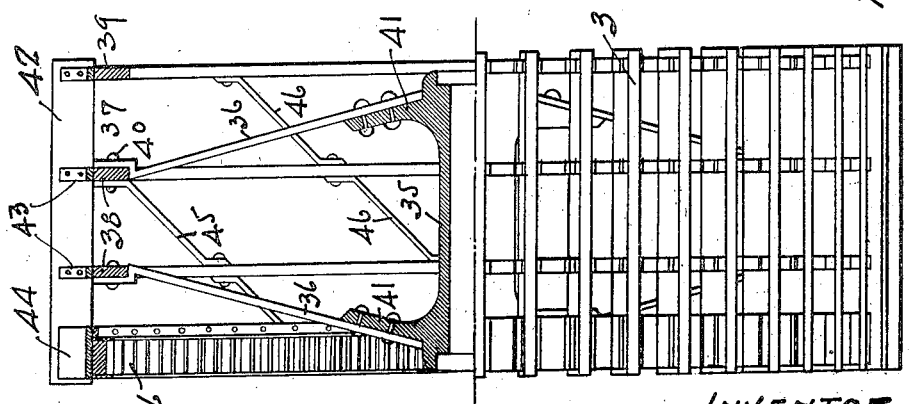

UNITED STATES PATENT OFFICE.

WILLIAM H. NEBERGALL, OF PENDLETON, OREGON.

TRACTION-WHEEL.

1,123,351.  Specification of Letters Patent.  Patented Jan. 5, 1915.

Application filed July 5, 1912. Serial No. 707,802.

*To all whom it may concern:*

Be it known that I, WILLIAM H. NEBERGALL, a citizen of the United States, residing at Pendleton, in the county of Umatilla, State of Oregon, have invented certain new and useful Improvements in Traction-Wheels, of which the following is a specification.

This invention relates to improvements in traction wheels which is principally designed for either road or agricultural work.

An object of the invention is to provide an improved tractive wheel with the coupling so arranged as to obtain the necessary low speed transmission with a resulting maximum gear leverage.

A further object of the invention is to provide an improved form of tractive wheel which, by reason of the improved construction, can be made much lighter than heretofore.

The invention will be more fully described in connection with the accompanying drawings and will be more particularly pointed out in and by the appended claims.

In the drawings: Figure 1 is a view in side elevation of my improved tractive wheel. Fig. 2 is an edge view of the wheel shown in Fig. 1 with a portion in elevation and a portion in section.

Like numerals of reference designate similar parts throughout the different figures of the drawings.

Referring to my improved form of traction wheel, illustrated more fully in Figs. 1 and 2, the same consists of a center structure which may comprise a hub 35 and spokes 36, and a tractive tread which is indicated as a whole at 37. As shown the tread is made up of a plurality of parallel rings 38 and 39, the former being connected with the spokes 36 which latter converge inwardly toward their outer ends. The connection of the spokes 36 with the rings 38 is indicated at 40 and the inner ends of the spokes 36 are connected to flanged extensions 41 on the hub 35.

Tractive elements 42 are disposed about the periphery of the wheel and are arranged in spaced relation with respect to each other so as to provide through open spaces therebetween whereby clogging of field soil or road mud is effectively prevented, the open spaces between said elements having no bases. I may conveniently dispose the elements 42 transversely of the plane of the wheel and anchor them in place upon the rings 38 and 39 by U-shaped members 43, the latter being bolted to the rings 38 and 39 at their bases and to the elements 42 at their ends, as shown.

At one side of each of the wheels 3 is mounted the rack 26, hereinbefore referred to, and said rack may conveniently be substituted for an inner ring similar to the outer ring 39. The rack 26 is connected with the tractive elements 42 by U-shaped members 44. In order to counteract and overcome any torsional or twisting strains imposed by the application of driving power to the sides of the wheel 3, I desirably brace the same by laterally and preferably diagonally disposed brace members 45 and 46, which are riveted or otherwise suitably secured to the rings 38 and 39, as illustrated.

While I have herein shown and described one specific form of my invention it will be understood that I do not wish to be limited thereto except for such limitations as the claims may import.

I claim:

1. A traction wheel comprising in combination, a center structure and a tread therefor, a rack near one side edge and within said tread, and lateral and diagonal braces for said wheel counteracting side draft.

2. A traction wheel comprising a hub structure, a plurality of ring members surrounding said structure, spaced traction elements carried entirely on the outside of said rings, and U-shaped braces for connecting adjacent elements.

3. A traction wheel comprising in combination, a central hub provided at its end with inwardly inclined integral flanges, a plurality of rings surrounding said hub, the outer surfaces of said rings lying on a given cylindrical surface, spaced traction members carried on the outer surfaces of said rings and having their outer surfaces lying substantially in a given cylindrical surface, inwardly inclined spoke members connecting said flanges with two of said rings, and inclined brace members connecting said rings, said brace members forming acute angles with the planes of said rings.

4. A traction wheel comprising in combination, a central hub provided with inclined integral flanges, a plurality of rings surrounding said hub, the outer surfaces of said rings lying on a given cylindrical surface, spaced traction members carried on the outer surfaces of said rings and having their outer surfaces lying substantially in a given cylindrical surface, inclined spoke members connecting said flanges with two of said rings, and inclined brace members connecting said rings, said brace members forming acute angles with the planes of said rings, and U-shaped braces carried on the outer surfaces of said ring members intermediate said traction members and attached to said traction members.

5. A traction wheel comprising in combination, a central hub provided with inclined integral flanges, a plurality of rings surrounding said hub, the outer surfaces of said rings lying on a given cylindrical surface, spaced traction members carried on the outer surfaces of said rings and having their outer surfaces lying substantially in a given cylindrical surface, inclined spoke members connecting said flanges with two of said rings, and inclined brace members connecting said rings, said brace members forming acute angles with the planes of said rings, and U-shaped braces carried on the outer surfaces of said ring members intermediate said traction members and attached to said traction members, and a rack carried with said traction members at one edge thereof, and heavy U-shaped members resting on the outer surface of said rack intermediate said traction members.

In testimony whereof I affix my signature in presence of two witnesses.

WILLIAM H. NEBERGALL.

Witnesses:
   C. S. CHESHIRE,
   G. E. MASON.

Copies of this patent may be obtained for five cents each, by addressing the "Commissioner of Patents, Washington, D. C."